Oct. 4, 1932.  C. B. HASKINS  1,880,436
SCALE
Filed June 30, 1931
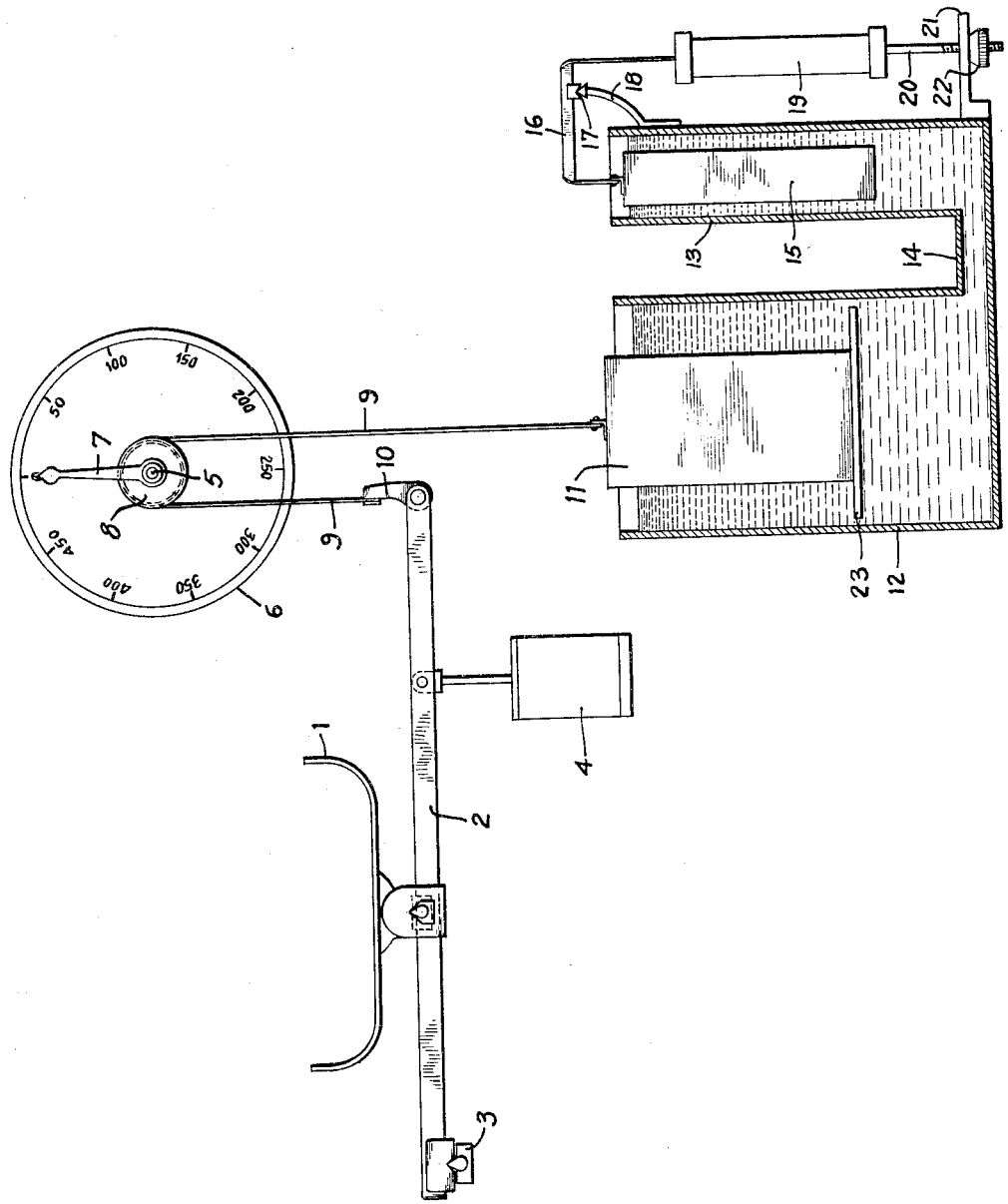
INVENTOR
Clifford B. Haskins
BY his ATTORNEY Patented Oct. 4, 1932

1,880,436

UNITED STATES PATENT OFFICE

CLIFFORD B. HASKINS, OF DAYTON, OHIO, ASSIGNOR TO DAYTON SCALE COMPANY, OF DAYTON, OHIO, A CORPORATION OF NEW JERSEY

SCALE

Application filed June 30, 1931. Serial No. 547,861.

This invention relates to weighing scales in general.

The primary object of the invention is to provide a novel scale in which advantage is taken of the effects of displacement of a liquid by a solid body to furnish the load counterbalancing force used in weighing a load on the scale platform or load support.

A further object is to provide a novel arrangement for compensating the effects of temperature variations which would otherwise adversely affect the accuracy of the scale.

Various other objects, advantages, or features of the present invention will be pointed out in the following specification and claims or will be clear from a study thereof and of the accompanying drawing.

The theory of operation of the present invention is based upon the well known physical phenomena according to which a body immersed in a liquid is buoyed up by a force equal to the weight of the volume of liquid displaced by the body. In other words, the body apparently suffers a loss in weight which is equal to the weight of the water displaced.

Let us assume that a body shaped like a right cylinder or right prism of uniform section is suspended in a liquid by means of a cord fastened to the center of gravity of one of the bases of the body. When the body is fully immersed in the liquid the tension on the cord will be at a minimum whereas the tension will be at a maximum when the cylinder or prism is suspended in mid-air and free of the liquid. When the cylinder or prism is suspended only partly immersed in the liquid the tension on the cord will be intermediate the maximum and the minimum tensions, the increase in tension over the minimum tension being directly proportional to the amount the cylinder or prism has been withdrawn from the liquid. Thus, if the cylinder or prism is only half immersed, the tension on the cord will be the mean of the maximum and minimum tensions.

It will be understood, of course, that there will be no variation in tension when the cylinder or prism is raised or lowered a distance which is insufficient to raise the upper end above the surface of the liquid or immerse the lower end in the liquid. Variation in the tension on the cord occurs only between two extremes—one being the position where the top surface of the body is just level with the surface of the liquid and the other being the position where the under surface of the body is level with the surface of the liquid. Since in the embodiment of the invention hereinafter to be described in detail the body will never be completely withdrawn from or submerged in the liquid, the effects of surface tension may be disregarded as a negligible factor or as uniform and therefore compensatable by suitable means.

The single figure represents diagrammatically the principle upon which the present invention is based. The reference numeral 1 designates a load support resting upon a conventional scale lever 2 having a fixed fulcrum at 3 and the customary oscillation damping device 4, such as a dash pot of any desired construction. Pivotally mounted upon a fixed shaft 5 is the indicating drum 6 which is arbitrarily shown as having a weight indicating capacity up to 500 lbs. Fixed to the shaft 5 is index hand or pointer 7 which remains immovable at all times and co-acts with the drums 6 to indicate the weight of the load on the load support 1.

Fixed to one side of the drum 6 is a second drum 8 about which is wrapped a cable or tape 9 secured at one end to a stirrup 10 pivoted to the free end of lever 2 while the other end of the tape or cable 9 is secured to a weight or float 11 partly immersed in an open vessel 12 filled with a suitable liquid.

A second vessel 13 has an open connection 14 with the vessel 12 and has suspended therein a compensating float or weight 15, the latter being partially immersed in the liquid which fills the vessel 13. The weight 15 is freely suspended from a lever 16 fulcrumed at 17 upon a fixed support 18. The free end of lever 16 is connected to one end of a thermostat 19 the other end of which is attached to a rod 20 adjustably connected to a fixed bracket 21 by means of a suitable device such as a thumbscrew 22.

The weight 11 may have any desired geometrical shape in horizontal cross-section and should be of uniform cross section with respect to the vertical axis passing through the point at which the cable 9 is attached in order to secure uniform deflections of the drum 6 relative to the pointer 7 for equal increments of weight. The base of the weight 11 should preferably be parallel with the surface of the liquid in order to be able to secure as wide a range of tensions on the cable 9 as is possible.

The operation of the system just described is as follows: With the parts in equilibrium in the position shown in the figure, let us suppose a load of 300 lbs. is placed on the load support 1. The right hand end of the lever 2 will be depressed thereby applying additional tension to the cable 9 with the consequence that the weight 11 will be raised and the drum 6 moved relative to the pointer 7. The tension on the cable will be automatically increased until the weight 11 has been withdrawn from the liquid an amount sufficient to bring the system into equilibrium again at which time the tension in the cable 9 will be 300 lbs. plus the additional tension due to the unbalanced weight of the load support 1, the lever 2, and the dash pot 4 which may be compensated by making the weight 11 of sufficient size.

As the weight 11 is withdrawn from the liquid, the buoyant effect of the latter diminishes with the consequence that the tension in the cable 9 is increased automatically until a condition of equilibrium is reached. Since the increase in the tension in cable 9 due to the decrease in the buoyant effect is proportional to the distance the weight 11 is withdrawn from the liquid, it is clear that the drum 6 will be turned a distance directly proportional to that part of the tension in the cable 9 which is due to the load on the load support and the true weight will be indicated by said drum.

Changes in temperature of the atmosphere will cause the cable 9, the weight 11, the vessel 12, and the liquid in the latter to expand or contract according to the nature of the change. The expansion or contraction of the vessel 12 is likely to partially compensate for the expansion or contraction of the liquid in said vessel depending upon the quantity and kind of liquid and upon the proportions and materials of the vessel. If suitable materials are chosen for the vessel and a liquid of desired characteristics is used, the expansion of the liquid may be completely compensated by the expansion of the vessel. There is also the additional problem of compensating for expansion or contraction of the weight 11 and the cable 9 which would be cumulative and would tend to raise or lower the level of the liquid in vessel 12 thereby causing an erroneous weight reading. It is desirable, therefore, that means be provided for maintaining the level of the liquid in vessel 12 at the proper height regardless of temperature variations and for this reason the thermostat 19 has been provided. As the temperature increases the levels of the liquid in vessels 12, 13 will both rise simultaneously by equal amounts and, in order to counteract such a rise in level, the thermostat 19 is arranged to withdraw the weight 15 an amount sufficient to offset the rise in level.

The thumbscrew 22 provides a means for adjusting the height of the liquid in both vessels in order to calibrate the apparatus to give a zero reading with no load on the load support. The effect of surface tension may be disregarded in most instances but, if it should be found to be an appreciable factor in a particular scale embodying this invention, it may be readily compensated by making the weight 11 lighter. The surface tension will be nearly uniform since the weight 11 is preferably of uniform cross section.

It is preferred that the thermostat 19 be of a form which will be unaffected by variations in the height of the liquid in vessels 12 and 13 due to movement of the weight 11 which would tend to vary the tension on the connections to the thermostat owing to changes in the buoyant effect of the liquid on the weight 15. In order to prevent undesirable oscillation of weight 11 it is preferable that the weight be provided with a damping fin 23.

Theoretically it is necessary that the weight 11 be of uniform cross-section with respect to its vertical axis, however, it may be found necessary in practice to use a weight varying in cross-section in order to compensate for such well-known factors as angularity of the lever system so that the drum 6 may be uniformly graduated.

This invention has been shown as embodied in a specific form solely for the purpose of illustrating the principle of operation and how the principle may be used to obtain the desired results, however, it is not desired to limit the scope of the invention to the precise embodiment or arrangement shown as variations may be introduced in practice both as to details and arrangement in order to utilize the invention to best advantage in particular applications.

I claim:

1. In a force measuring machine, a force sustaining member, hydraulic counterbalancing means therefor including a vessel containing fluid and a weight buoyed up thereby, and means for compensating for variation in level of the fluid with variations in temperature, said means comprising a second vessel connected with the first vessel, a float immersed in the fluid in the second vessel, and a thermostat for varying the degree of immersion of said float to adjust the level of the fluid in both vessels.

2. In a force measuring machine, a force sustaining member, a hydraulic counterbalance therefor, thermostatic means for compensating variations in counterbalance due to changes in temperature, and means coacting with said thermostat for sealing the machine at zero position.

3. In a force measuring machine, a force sustaining member, a hydraulic counterbalance therefor including a weight associated with said member and a fluid holding vessel in which the weight is movable, and means for adjusting the level of the fluid in said vessel including a second vessel filled with fluid and having connections to the first vessel, and an adjustable member acting on the fluid in the second vessel.

In testimony whereof I hereto affix my signature.

CLIFFORD B. HASKINS.